Figure 1:
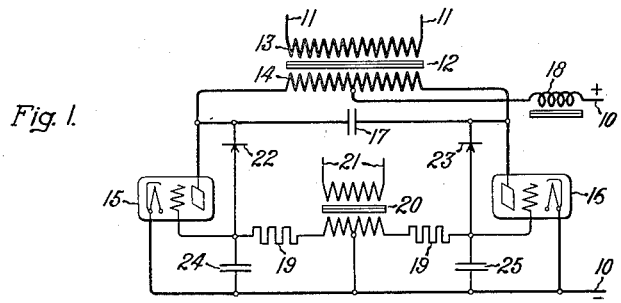

July 24, 1934.                M. M. MORACK                1,967,896
                    ELECTRIC VALVE CONVERTING APPARATUS
                         Filed July 30, 1932

Inventor:
Marvin M. Morack,
by Charles E. Tullar
His Attorney.

Patented July 24, 1934

1,967,896

UNITED STATES PATENT OFFICE 1,967,896

ELECTRIC VALVE CONVERTING APPARATUS

Marvin M. Morack, Schenectady, N. Y., assignor to General Electric Company, a corporation of New York Application July 30, 1932, Serial No. 626,789

10 Claims. (Cl. 175—363)

My invention relates to electric valve converting apparatus and more particularly to such apparatus known in the art as a parallel inverter and including vapor electric discharge valves. There are now well known in the art several types of valve converting apparatus for transmitting energy between direct and alternating current circuits. Of these, the parallel inverter utilizing valves of the vapor electric discharge type has found particular favor because of its stability, high apparatus economy and efficiency. It is well understood that in this type of apparatus the current is commutated between the electric valves by forcing the anode potential of one of the valves negative with respect to its cathode for a short interval of time to interrupt the current therein and simultaneously making the grid negative to maintain the valve non-conductive for the succeeding half cycle. In order for the grid to maintain control over the conductivity of the valve, however, it is necessary for the valve to become deionized. Heretofore, there has been a rather definite frequency limitation upon the operation of parallel inverters utilizing vapor electric valves because of the fact that at the higher frequencies an insufficient time was available for deionizing the valves.

It is an object of my invention, therefore, to provide an improved valve converting apparatus of the parallel inverter type employing vapor electric valves which will overcome the above mentioned disadvantages of the arrangements of the prior art and which will be simple and reliable in operation.

It is another object of my invention to provide an improved electric valve converting apparatus of the parallel inverter type employing vapor electric valves in which the upper frequency limit of operation may be considerably extended.

It is a further object of my invention to provide an improved electric valve converting apparatus of the parallel inverter type employing vapor electric valves in which the grids of the electric valves are subjected to a very high negative deionizing potential during the commutating period.

In accordance with my invention, a parallel inverter including an inductive winding and a pair of grid controlled vapor electric valves is provided with capacitance means connected to be charged with potential across the inductive winding. There is also provided circuit means independent of the normal grid control circuit for impressing on the grid of each of the valves during alternate commutating periods, a transient negative potential derived from the capacitance means. This high negative potential impressed upon the grids of the valves during the commutating periods is effective to reduce the time required for deionization and thus to extend the upper frequency limit of satisfactory operation.

Figure 2:
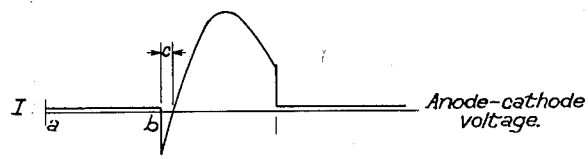
Figure 3:
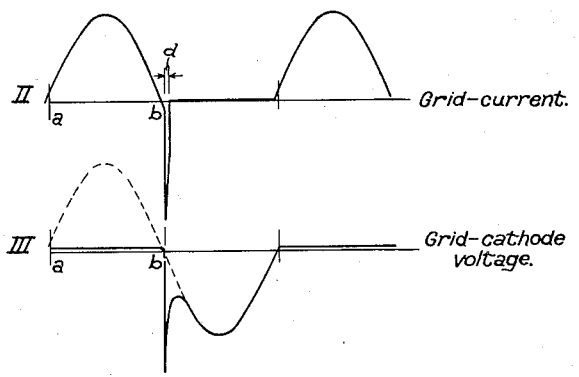
Figure 3:
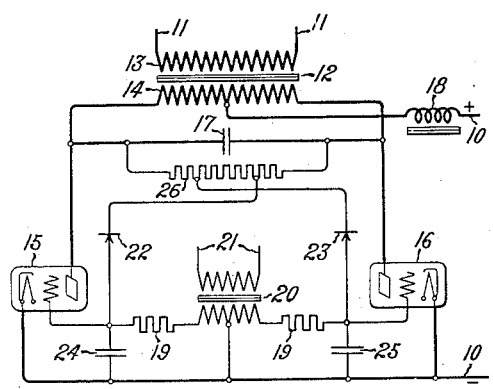
Figure 4:
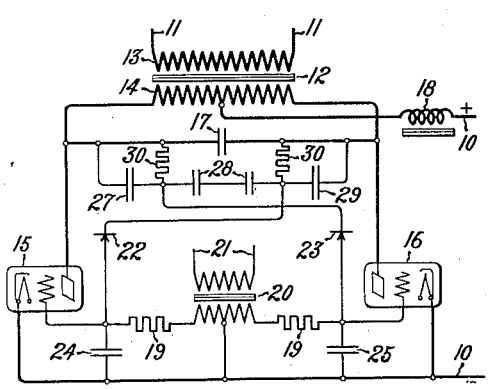

For a better understanding of my invention, together with other and further objects thereof, reference is had to the following description taken in connection with the accompanying drawing, and its scope will be pointed out in the appended claims. In the drawing, Fig. 1 illustrates a parallel inverter embodying my invention; Fig. 2 represents certain operating characteristics of the apparatus shown in Fig. 1, while Figs. 3 and 4 illustrate modifications of the arrangement of Fig. 1 suitable for operating from a high voltage direct current circuit.

Referring now to the drawing, there is illustrated an arrangement for transmitting energy from a direct current circuit 10 to an alternating current circuit 11 which may operate at relatively high frequency. This apparatus comprises a transformer 12 provided with a secondary winding 13 connected to the circuit 11 and a primary winding 14 having an electrical neutral connected to the positive side of the direct current circuit and with end terminals connected to the negative side of the direct current circuit through electric valves 15 and 16. The valves 15 and 16 are each provided with an anode, a cathode and a control grid and are of the vapor electric discharge type in which the starting of current in a valve is controlled by the potential on its control grid, but in which the current in the valve may be interrupted only by reducing its anode potential below the critical value. The commutating capacitor 17 is connected between the anodes of the valves 15 and 16, that is across the terminals of the winding 14, and a smoothing reactor 18 is preferably included in the direct current circuit as illustrated.

In order periodically to render the valves 15 and 16 alternately conductive and nonconductive, the grids of these valves are connected to their respective cathodes through current limiting resistors 19 and opposite halves of the secondary winding of a grid transformer 20, the primary winding of which is connected to any suitable alternating current circuit 21 of a frequency which it is desired to supply to the circuit 11. The grids of the valves 15 and 16 are also connected to the terminals of capacitor 17 which are connected to their respective anodes through unilaterally conductive devices illustrated as contact rectifiers 22 and 23, respectively. In some cases it may be desirable also to connect capacitors 24 and 25 between the grids and cathodes of the valves 15 and 16, respectively.

The general principles of operation of the above described inverter will be well understood by those skilled in the art. The detailed operation of the apparatus, however, to secure the rapid deionization of the valves will be better understood by reference to the curves of Fig. 2 which represent the operating characteristics of one of the electric valves, for example, the valve 15. Assume for example, that electric valve 15 is initially conductive during the interval $a$—$b$. The voltage drop across the valve during this interval will be a small fixed value as indicated by curve I of Fig. 2. During this same interval the grid current will be as represented by the curve II, and the grid voltage as represented by the solid curve III, since the grid acts as an auxiliary rectifying anode during this conducting period. During this interval, capacitor 17 becomes charged to a potential equal to that appearing across the winding 14 and, at the instant that the grid potential reverses polarity and renders the valve 16 conductive, this capacitor is effective to initiate the current in the valve 16 and interrupt the current in the valve 15 by momentarily depressing its anode potential, as is well understood by those skilled in the art. The anode of the valve 15 remains negative for the interval $c$ of curve I required for the capacitor 17 to become discharged, and it is necessary for the valve 15 to become completely deionized during this interval $c$ in order that its grid may regain control of its conductivity and prevent current from restarting at the end of the interval $c$ when the anode potential reverses polarity. When the valve 16 becomes conductive it will be noted that the potential of the capacitor 17 is impressed directly across the grid and cathode of the valve 15 through the contact rectifier 22, which is connected to transmit current only from the grid to the capacitor 17. In other words, substantially the same negative voltage that is impressed between the anode and cathode of the valve 15 is similarly impressed between the grid and cathode and is effective to secure a rapid deionization of the valve. This is illustrated more clearly in the curves II and III of Fig. 2, in which it is seen that at the instant $b$ the negative grid current, that is, the positive ion current effective to deionize the valve, reaches a very high peak and lasts only for the interval $d$, when the deionization of the valve is completed. This transient negative deionizing potential is illustrated in curve III of Fig. 2, superimposed upon the sinusoidal grid potential illustrated in dotted lines. The capacitor 24 connected between the grid and cathode of the valve 15 is effective to minimize the influence of transients in the anode circuit of the valve upon the grid circuit, which in some cases may tend to deprive the grid of proper control. Obviously, the interruption of the current in the valve 16 and the deionization of the valve is effected in a similar manner at the end of the next half cycle. Thus it is seen that the time required for the deionization of the valves is substantially less than the interval $c$, known in the art as the commutating period. Obviously, as the operating frequency increases the commutating period $c$ becomes shortened and the upper limit of operating frequency is reached when the commutating period approaches the deionization time. Thus, by materially shortening the deionization time, the upper limit of operating frequency may be considerably extended.

In the arrangement of Fig. 3, a resistance potential divider 26 is connected across the capacitor 17 in order that a fraction of the capacitor voltage may be utilized to deionize the valve. Such an arrangement is particularly suitable for high voltage circuits. The operation of this arrangement is similar to that described above. Similarly, in the arrangement of Fig. 4, a capacitance potential divider comprising terminal capacitors 27 and 29 and one or more intermediate capacitors 28, preferably having a smaller capacity than that of capacitors 27 and 29, is connected across the capacitor 17. With such an arrangement, it has been found preferable to connect a high resistance leak 30 across the capacitors 27 and 29 to prevent their accumulating a charge of any given polarity.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an inverter of the parallel type including an inductive winding, a pair of grid controlled vapor electric valves and a grid circuit for normally controlling the conductivity thereof, means for securing a rapid deionization of the valves during the commutating periods comprising capacitance means connected to be charged with the potential across the inductive winding, and a circuit independent of the normal grid control circuit for impressing on the grid of each of the valves during alternate commutating periods a transient negative potential derived from said capacitance means.

2. In an inverter of the parallel type including an inductive winding, a pair of grid controlled vapor electric valves and a grid circuit for normally controlling the conductivity thereof, means for securing a rapid deionization of the valves during the commutating periods comprising capacitance means connected to be charged with the potential across the inductive winding, and a pair of circuits each including the anode-cathode circuit of one of the valves and connected to impress on the grid of the other valve during alternate commutating periods a transient negative potential derived from said capacitance means.

3. In an inverter of the parallel type including an inductive winding, a pair of grid controlled vapor electric valves and a grid circuit for normally controlling the conductivity thereof, means for securing a rapid deionization of the valves during the commutating periods comprising a capacitor connected across said inductive winding, and a pair of circuits, each including the anode-cathode circuit of one of the valves and connected to impress with a negative polarity on the grid of the other valve during alternate commutating periods a potential proportional to the potential of said capacitor.

4. In an inverter of the parallel type including an inductive winding, a pair of grid controlled vapor electric valves and a grid circuit for normally controlling the conductivity thereof, means for securing a rapid deionization of the valves during the commutating periods including a capacitor connected to be charged with the potential across the inductive winding, and a circuit for connecting said capacitor between the grid and cathode of one of the valves during alternate commutating periods.

5. In an inverter of the parallel type including an inductive winding, a pair of grid controlled vapor electric valves and a grid circuit for normally controllng the conductivity thereof, means for securing a rapid deionization of the valves during the commutating periods including a capacitor connected to be charged with the potential across the inductive winding, and rectifying means interconnecting the grid of each valve with the terminal of said capacitor connected to its respective valve circuit and connected to impress with a negative polarity the potential of said capacitor upon said grid through the other valve during alternate commutating periods.

6. In combination, a direct current supply circuit, an alternating current load circuit comprising an inductive winding, a connection from said winding to one side of said direct current circuit, a pair of grid controlled vapor electric valves with their anodes connected to the terminals of said winding and their cathodes connected to the other side of said direct current circuit, a commutating capacitor connected between the anodes of said valves, a grid circuit for normally rendering said valves alternately conductive and nonconductive, a rectifier interconnecting the grid and anode of each valve, and a capacitor interconnecting the grid and cathode of each valve.

7. In an inverter of the parallel type including an inductive winding, a pair of grid controlled electric valves, and a grid circuit for normally controlling the conductivity thereof, means for securing a rapid deionization of the valves during the commutating periods including a capacitor connected to be charged with the potential across the inductive winding, potential dividing means connected in circuit with said capacitor, and rectifying means interconnecting the grid of each valve with a point on said potential dividing means.

8. In an inverter of the parallel type including an inductive winding, a pair of grid controlled electric valves, and a grid circuit for normally controlling the conductivity thereof, means for securing a rapid deionization of the valves during the commutating periods including a capacitor connected to be charged with the potential across the inductive winding, a resistance potential divider connected across said capacitor, and rectifying means interconnecting the grid of each valve with an intermediate point of said potential divider.

9. In an inverter of the parallel type including an inductive winding, a pair of grid controlled electric valves, and a grid circuit for normally controlling the conductivity thereof, means for securing a rapid deionization of the valves during the commutating periods including a capacitor connected to be charged with the potential across the inductive winding, a capacitance potential divider connected across said capacitor, and rectifying means interconnecting the grid of each valve with an intermediate point of said potential divider.

10. In combination, a direct current supply circuit, an alternating current load circuit, an inductive winding, a pair of grid controlled vapor electric valves interconnecting said circuits through said winding, means for exciting the grids of said valves to render them alternately conductive and nonconductive, capacitance means connected to be charged with the potential across said inductive winding, and a circuit independent of the normal grid excitation circuit for impressing on the grid of each of said valves during alternate commutating periods a transient negative potential derived from said capacitance means.

MARVIN M. MORACK.